(12) United States Patent
Niu (10) Patent No.: US 6,910,961 B2
(45) Date of Patent: Jun. 28, 2005

(54) INDOOR VENTILATION SYSTEM WITH PERSONALIZED VENTILATION DEVICE AND ITS METHOD OF USAGE

(76) Inventor: Jianlei Niu, Department of Building Services Engineering, The Hong Kong Polytechnic University, Hunghorn, Kowloon, Hong Kong (CN)

( * ) Notice: Subject to any disclaimer, the term of this patent is extended or adjusted under 35 U.S.C. 154(b) by 82 days.

(21) Appl. No.: 10/664,317

(22) Filed: Sep. 17, 2003

(65) Prior Publication Data

US 2004/0224628 A1 Nov. 11, 2004

(30) Foreign Application Priority Data

Sep. 20, 2002 (CN) ........................................ 02142478 A (51) Int. Cl.[7] .................................................. F24F 7/00
(52) U.S. Cl. ..................................... 454/333; 454/907
(58) Field of Search .............................. 454/907, 903, 454/333, 338

(56) References Cited

U.S. PATENT DOCUMENTS

| 760,182 | A | * | 5/1904 | Osborn ........................ 454/333 |
|---|---|---|---|---|
| 4,840,115 | A | * | 6/1989 | Johnson et al. .............. 454/120 |
| 5,261,855 | A | * | 11/1993 | Law et al. ..................... 454/76 |
| 6,604,785 | B2 | * | 8/2003 | Bargheer et al. ........ 297/180.14 |
| 6,709,328 | B1 | * | 3/2004 | Jain et al. .................... 454/144 |

* cited by examiner

Primary Examiner—Derek S. Boles
(74) Attorney, Agent, or Firm—Alix, Yale & Ristas, LLP (57) ABSTRACT

Personal air supply devices integrated with chairs are adapted for use in conjunction with building or vehicle ventilation systems. The personal air supply devices include ducts, a tube and a nozzle arranged to direct a portion of the air from the building or vehicle ventilation system at the facial zone of a person sitting in the chair. The personal air supply devices include airflow regulating devices for regulating the flow of air through the nozzle. The tubes and nozzle are configured to release air from the ventilation system very close to the nose and mouth of a person in the chair to prevent mixing with ambient air and maximize the cooling and refreshing effect of the conditioned air. The building or vehicle ventilation system may be operated at lower ventilation rates without causing discomfort to persons provided with personal air supply devices.

14 Claims, 6 Drawing Sheets

INDOOR VENTILATION SYSTEM WITH PERSONALIZED VENTILATION DEVICE AND ITS METHOD OF USAGE

FIELD OF THE INVENTION

The present invention relates to a ventilation system, and more particularly, to a ventilation system with personal air supply devices combined with chairs for distributing conditioned air from a central air conditioning system to persons seated in the chairs.

BACKGROUND OF THE INVENTION

The purpose of air conditioning and ventilation systems in buildings and transportation vehicles is to supply persons in the buildings or vehicles with clean, fresh temperature controlled air. One reason for air conditioning and ventilation systems is to ensure that each person in an enclosure inhales air with acceptable air pollutant levels. Since people might be at different positions inside a building or vehicle, it is necessary to re-circulate and condition all the air in the whole building or vehicle passenger compartment. Typical ventilation systems are designed to re-circulate, filter and control the temperature of all the air in the building or vehicle. Outlets delivering fresh air to the building or vehicle may be quite distant from persons in the building or vehicle. For example, the ventilation outlets in offices, cinemas, musical halls, planes, ships, trains, buses, etc. are typically located on the ceiling or roof of the structure. The air from the outlet will mix with dust and pollutants in the room before reaching people, so the quality of the air inhaled by people in the room is worse than the quality of air from the outlets.

A personal air conditioner system, having a plurality of outlets aimed at every user used in offices, has been disclosed in U.S. Pat. No. 6,318,113 B1 (the '113 patent). The system outlets are illustrated as positioned in the floor, desk or walls a distance of at least approximately two feet from the person's nose and mouth. The ventilation system is inefficient because directing airflow in different directions will not further overall movement of air and waste energy. The distance between the ventilation outlets and the people in the room permits optimal air from the outlets to mix with dust and other pollutants in the room. The system disclosed in the '113 patent is inefficient because it cools (or heats) indoor objects by contact, e.g., walls, glazing, ceilings, bulbs etc. These are typically objects which should not be cooled (or heated) will also be cooled (or heated). Energy is wasted on this unnecessary cooling (or heating).

An air conditioning device installed on the back of the chairs in a cinema has been disclosed in U.S. Pat. No. 4,035,018. (the '018 patent). The '018 patent ventilation system outlets overcome the deficiency of mixing indoor air compared with the '113 patent, but the outlet are still too far from the nose and mouth of those seated in the chairs. The '018 patent also discloses an air inlet about a foot from the floor at every air supply duct. An air intake in this position will draw in dusts and other pollutants from the floor. These pollutants will be delivered through the ventilation system. Thus it can be seen that however optimal the air from existing ventilation systems might be, if the ventilation outlets are positioned a significant distance from the breathing zone (nose and mouth) of occupants, the air delivered to the occupants is mixed with polluted indoor air.

The American Society of Heating Refrigerating and Air conditioning Engineers (for short hereinafter, ASHRAE) promulgates a rate of outdoor fresh air intake of around 10 liters/second/person to ensure an acceptable indoor air quality. This is far in excess of the actual the human respiration rate for fresh air, which is around 0.1 liters/second/person. In other words, the existing ventilation systems and accepted rates of fresh air intake are approximately 100 times greater than would appear necessary (namely, the utilization efficiency is only 1%). This means that much more air is heated (or cooled), filtered, disinfected (e.g. using UV radiation), deodorized, humidified (or dehumidified) and moved than would be necessary with more efficient delivery systems. As a result, tremendous quantities of energy are wasted.

Further, people sitting in a restricted space (e.g., planes, ships, trains, coaches etc.) for a long time, may have to suffer with unpleasant odors produced by their fellow occupants. These may include smoke (even in non-smoking sections), body odor, and food odors (such as civet durian or fish). Some restrictions on occupant behavior such as no smoking, no eating, no taking off shoes have been imposed to minimize odors that may disturb others. However, such restrictions can make occupants uncomfortable, and still not prevent the unseen and imperceptible spread of pathogens (such as virus of influenza and tuberculosis bacteria). This is a serious concern given the recent epidemic of several new respiratory diseases.

SUMMARY OF THE INVENTION

An object of the present invention is to provide a new and improved ventilation system, in which some outlets communicate with personal air supply devices integrated into chairs, and the whole space is still supplied with air by prior art-type ventilation devices, but with a reduced fresh air supply rate. The personal air supply devices are configured to deliver air from the outlets to an occupant's breathing zone over a very short distance. The advantage of placing the ventilation system outlets close to the breathing zone of the occupants is that the fresh air does not mix significantly with the indoor air, helping to reduce the chances of infection from airborne germs and the inhalation of dusts and other air pollutants.

Another object of the present invention is to provide a new and improved ventilation system that reduces energy consumption by reducing the need for outdoor air from approximately 10 l/s to below 4 l/s without reducing the quality of air delivered to a particular occupant. This reduction in outdoor air saves energy by avoiding the expense of conditioning large volumes of outdoor air.

A further object of the present invention is to provide a ventilation system, which not only permits people to engage in previously restricted behaviors (like smoking) without bothering others, but also can reduce the chance of infection from airborne infectious diseases.

These and other objects of the present invention are achieved by a ventilation system including personal air supply devices in combination with existing ventilation devices operated at significantly reduced flow rates. The personal air supply devices are located at seats or chairs and include a supply duct connected with a conduit of the existing ventilation system for supplying air as well as functioning as the armrest of the chair. An airflow regulating device is arranged to regulate the flow of air through the horizontal duct, the tube and the nozzle on the top of the tube. The airflow regulating device may be configured to be controlled by either a person in the chair or by the building or vehicle ventilation system personnel, or both.

The ventilation system according to the present invention begins by filtering, deodorizing, heating (or cooling), disinfecting, humidifying (or dehumidifying), and delivering outdoor intake air as is known in the art. The cleaned and conditioned air is then delivered to a main ventilation duct. The ventilation system according to the present invention supplies air to a given area by two kinds of devices. A major portion of the air conditioned by the building or vehicle ventilation system is delivered to spaces such as lobbies and hallways where people are moving and standing using existing ducts and vents typically arranged in the floor, walls and/or ceiling. Seating areas are supplied with air through a duct communicating with personal air supply devices built into each seat. The personal air supply device includes controls allowing suitable air volumes for each individual by adjustment of the rate of airflow. A selected volume of conditioned air is delivered very close to the breathing zone of a person in the seat by the nozzle at the end of the tube.

A method of indoor ventilation with a ventilation system comprising a combination of personal air supply devices located at chairs in combination with prior art ventilation devices includes the following steps:

(1) Setting the conventional ventilation system to deliver around 8 l/s/person before the passengers (or audience) enter and sit;

(2) At the same time, setting personal air supply device located at each chair according to the present invention at maximum airflow, i.e., the rating for individual of the air volumes supplied around 2 l/s/person;

(3) After each person has taken a seat, decreasing the supplied air volumes by the conventional ventilation system gradually to one quarter, i.e., around 2 l/s/person. (Alternatively, the air supply volume of the conventional system can be maintained at 8 l/s/person, as in step (1), and in this case, this step and the following steps can be avoided);

(4) Increasing the supplied air volumes in the conventional ventilation system to around 8 l/s/person, before the passengers (or audience) leave their seats;

(5) After the passengers (or audience) have taken their seats again, decreasing the supplied air volumes in the conventional ventilation system to around 2 l/s/person;

(6) Increasing the supplied air volume in the conventional ventilation system to around 8 l/s person, before the passengers (or audience) rise to leave;

(7) At the time of workers clearing the scene after all the passengers (or audience) leave, reducing the conventional ventilation system to around 2 l/s/person, and adjusting the personal air supply apparatus located at each chair to its maximum flow of approximately 2 l/s.

BRIEF DESCRIPTION OF THE DRAWINGS

Preferred embodiments of the invention will be described herein in conjunction with the accompanying drawings, in which.

DETAILED DESCRIPTION OF THE PREFERRED EMBODIMENT

Figure 1:
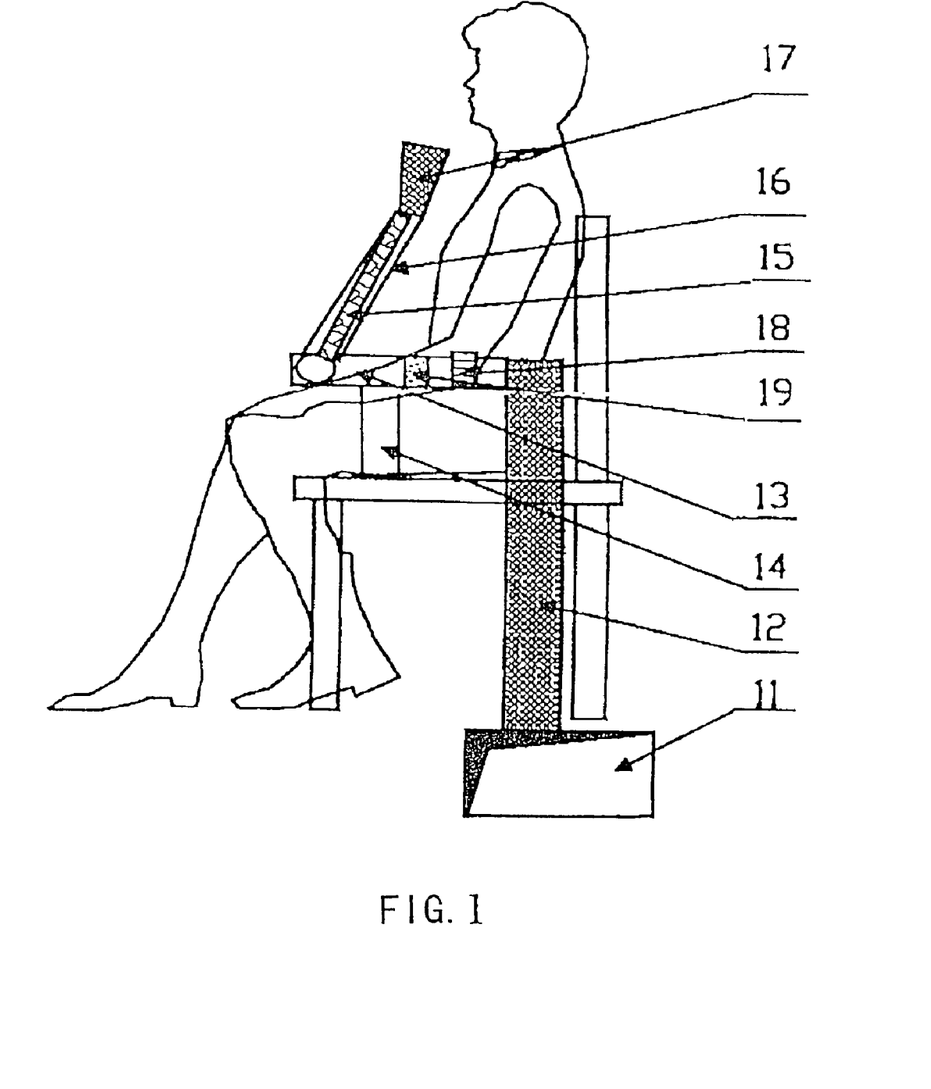
FIG. 1 is a side view of a personal air supply device according to one aspect of the present invention.

A preferred embodiment of a ventilation system including personal air supply devices will be described with reference to FIGS. 1–9B. Referring now to FIG. 1, the main conduit 11 for supplying air may run beneath the floor and parallel to the direction of the seats, although the position of the main conduit 11 is not so limited. A supply duct 12 extends upwardly from the main conduit 11 and is shown as an independent element from the chair rear legs. Alternatively, the supply duct 12 may be integrated with one or more of the front or rear chair legs. The supply duct 12 may also be integrated with the armrest support 14. Since the ventilation device of the present invention is operated at low pressures and small volumes, the inside diameter of the supply duct 12 is approximately 2 inches or less. The materials for the supply duct should be inert, odor free and non-flammable. Such materials include, but are not limited to aluminum, fireproof polythene, etc.

The supply air temperature for the personal air supply device is expected to range from 17 to 25° C., which is well above the dew-point of the space air in an air-conditioned space. In this case, there is no condensation problem. To prevent condensation on the outside of the supply duct 12 when the supply air temperature becomes accidentally low, it may be necessary to add an insulating layer (e.g., foam rubber) and a protective layer (e.g., leather-like vinyl) for protecting the insulation layer on the outer surface of the supply duct 12.

In the disclosed embodiment, a horizontal duct 13 communicates between the supply duct 12 and a tube 15. The horizontal duct 13 is integrated with the armrest of the chair. Alternatively, the horizontal duct 13 may be separate from the armrest of the chair, e.g., under or along the armrest. The requirements for the inside diameter and materials of the horizontal duct 13 are the same as those for the supply duct 12. If the horizontal duct 13 itself is the armrest, it is necessary to consider the problems of both insulation and wearability when using aluminum as a material. For instance, covering the aluminum pipeline with a layer of foam rubber first, and then covering the foam rubber with a layer of leather-like vinyl for the sake of preventing the friction of people's sleeves.

The tube 15 connected to the horizontal duct 13 may be a flexible hose or tube having a diameter of approximately 2 inches or less. A variety of existing tubes may be used, for instance the tubes used in diving devices or gas masks, etc., so long as the tube possesses the necessary inert, odor-free and fireproof characteristics.

A nozzle support 16 is set around the tube 15 to adjustably support the nozzle 17 shown in FIG. 1 at a fixed position in space. The nozzle support 16 may take any form that is flexible and will hold a position given it by a user. One example of such a support is shown in U.S. Pat. No. 5,521,803. However, this is only an example. The nozzle support 16 may be omitted, and the nozzle 17 fixed near the user's chin by other known methods. The nozzle may be connected to the user so that the relative position of the nozzle 17 and the breathing zone of the user won't change greatly, while the user turns about as well as looks down or up in some limit at his/her seat.

The nozzle 17 in FIG. 1 is a cup-shaped apparatus, whose opening near the user's chin may be a circular opening 17a ranging from 6 cm. to 12 cm., or a square opening with 6 cm. sides. The underside from the cup's opening may taper to connect with the tube 15, in order to prevent unnecessary turbulence due to an abrupt expansion of the air passage diameter. The height 17b of the cup body is about 10 cm. The nozzle 17 may be made of non-flammable, inert, odor-free flexible rubber for safety concerns.

The airflow regulating device 18 located on the horizontal duct 13 belongs to the existing technology. The approximate position of the airflow regulating device 18 is illustrated in FIG. 1. The airflow regulating device 18 is configured to control the volume of air flowing into the tube 15 at 5 levels from 0.1 l/s at least until 2.0 l/s (namely, 0.1 l/s, 0.5 l/s, 1.0 l/s, 1.5 l/s, and 2.0 l/s). The range of 0.1 l/s to 2.0 l/s is derived from the metabolic human respiration rate of approximately 0.1 l/s. The utilization efficiency ($\eta u$) shown in FIG. 7 measured by the testing device of FIG. 2, of the personal air supply system will decrease to 0.05 (i.e., 5%) as the supplied airflow rate at the nozzle 17 increases to 2 l/s. Still, this utilization rate ($\eta u$) is still 5 times higher than 1% utilization rate of the prior art ventilation technology. When the personal air supply device of the present invention is in operation, filtered air having a predetermined temperature (e.g., 20° C.) and humidity (e.g., 60%–70%) is delivered to the whole facial area of the user. Delivering cool air to the facial area is effective for cooling the whole body because the human head contains ⅓ of the blood flow of the whole body, and the lungs are another important organ for cooling the body. Directing cool, filtered air where it will have the greatest effect improves the efficiency of the ventilation system according to aspects of the present invention.

An exemplary position for an air deodorizer 19 is shown in FIG. 1, the function of which will be described below.

Figure 2:
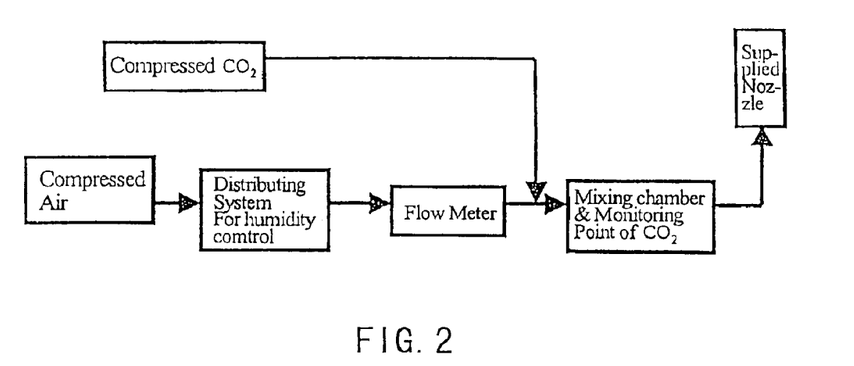
FIG. 2 is a functional block diagram of a ventilation system including a $CO_2$ testing device.
Figure 3:
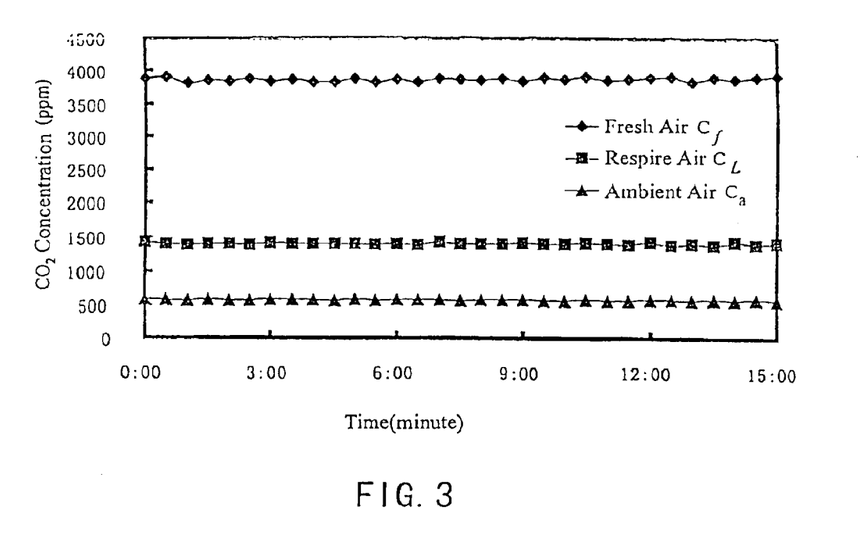
FIG. 3 is a diagram of the measured tracer gas $CO_2$ concentrations in the supplied air, breathed air, and ambient air measured by the testing device of FIG. 2.

FIG. 2 is a functional block diagram of a testing procedure for the personal air supply device shown in FIG. 1. $CO_2$ was used as a tracer gas in the testing procedure illustrated in FIG. 2. The testing procedure of FIG. 2 with $CO_2$ as a tracer gas produced that data presented in Table 1 and the measurements graphically presented in FIG. 3. The cup-shaped nozzle 17 is positioned near the chin of an automatic breathing manikin that simulates human respiration and $CO_2$ release. During 15 minutes of testing, the measured concentration of $CO_2$ in fresh air $C_f$, respired air $C_L$, and ambient air $C_\mu$ are shown in FIG. 3. The $CO_2$ concentrations shown in FIG. 3 were measured at an airflow of 0.5 l/s. The $CO_2$ levels are highest in the fresh air $C_f$ because $CO_2$ was used as a tracer gas for experimental purposes.

Figure 4:
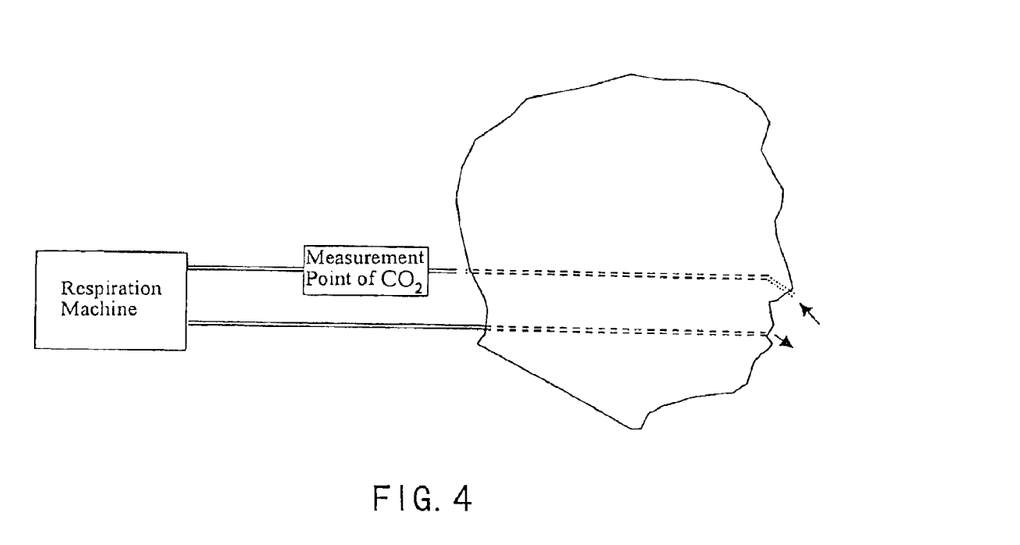
FIG. 4 illustrates the block graph of inhaling air of the testing device of FIG. 2.
Figure 5:
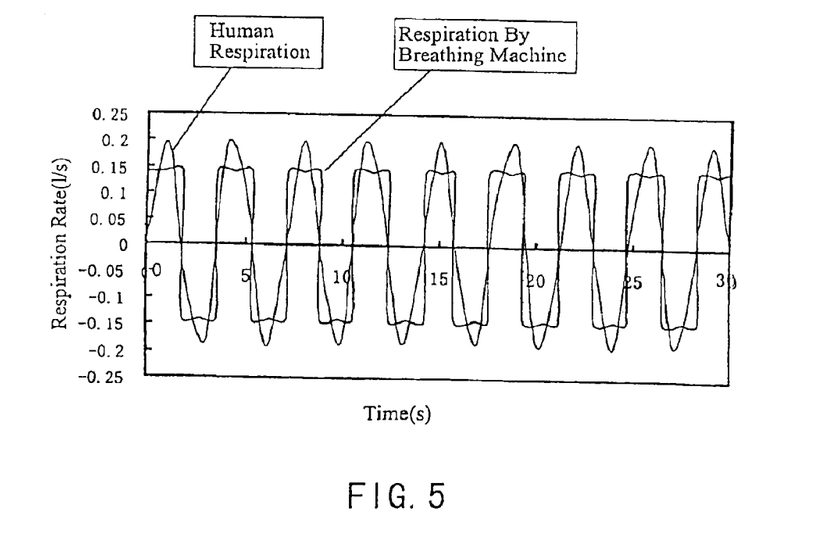
FIG. 5 shows the diagram of comparing human respiration curve and respiration curve by the testing device of FIG. 2.

FIG. 4 is a block diagram of inhaling air of the automatic breathing manikin of FIG. 2. FIG. 5 compares the respiration of the manikin to that of a human. The respiration of the manikin closely simulates that of a human.

Table 1 illustrates the pollutant exposure reduction index $\eta_{PER}$/ventilation efficiency $\eta f$ for three shapes of nozzles 17 at five airflow rates sampled by the testing procedure of FIG. 2. Two circular nozzles with diameters of 6.5 cm and 12 cm and a square nozzle with 5.7 cm. sides were tested at air flow rates of 0.1/0.5/1.0/1.5/2.0/2.5 l/s were tested. The following variables were defined:

CaP—air pollutant concentration in ambient room air;
$C_{LP}$—air pollutant concentration in inhaled air;

And the pollutant exposure efficiency $\eta_{PER}$ was defined as the following equation:

$$\eta_{PER}=(CaP-C_{LP})/Cap=(1-C_{LP}/CaP); \quad \text{Equation 1}$$

If the inhaled air is pollutant-free, $\eta_{PER}=1$; and if the inhaled air contains the same pollutant level as the ambient room air does, $\eta_{PER}=0$. Therefore, the pollutant exposure reduction efficiency $\eta_{PER}$ in the scale of 0 to 1 is a measure of the performance of the personal air supply method.

In order to find out the values of $\eta_{PER}$ by experimental studies, the following parameters were defined:

$V_f$—airflow volume of the personal air supply system (namely, the five flow rates from 0.1–2 l/s);
$V_L$—the inhaled air volume;
$V_{FL}$—the fresh air volume in the inhaled air volume;
$C_f$—the tracer gas $CO_2$ concentration of fresh air;
Ca—the $CO_2$ concentration of ambient room air; and
$C_L$—the resultant $CO_2$ concentration of inhaled air.

And the ventilation efficiency is defined as the percentage of fresh air in the inhaled air, which can be calculated from the measured $CO_2$ concentrations $C_f$, $C_a$, and $C_L$ according to the following equation:

$$\eta f=V_{FL}/V_L=(C_f-Ca)/(C_L-Ca). \quad \text{Equation 2}$$

where $\eta_f$ of equation 2 is ventilation efficiency. Numerically, the ventilation efficiency $\eta_f$ and the pollutant exposure reduction efficiency $\eta_{PER}$ are equal to each other. The data shown in Table 1 are the values of $\eta_f$ calculated according to equation 2. Table 1 shows that, when the nozzle 17 of the personal air supply device of the present invention is used, the pollutant in the inhaled air may decrease 60% (i.e., 0.55/0.56/0.61). In other words, if the inhaled pollutant content is 100 without using the present invention, the user only inhales a pollutant content of 40 when using the present invention.

Table 1 shows the table of pollutant exposure reduction index and ventilation efficiency for three different nozzles at five flow rates as measured gained by the testing procedure of FIG. 2.

TABLE 1

| | Circular Nozzle (65 mm) | Rectangular Nozzle | Circular Nozzle (120 mm) |
| --- | --- | --- | --- |
| 0.1 l/s | 0.09 | 0.08 | 0.04 |
| 0.5 l/s | 0.25 | 0.24 | 0.2 |
| 1.0 l/s | 0.36 | 0.35 | 0.32 |
| 1.5 l/s | 0.5 | 0.52 | 0.55 |
| 2.0 l/s | 0.55 | 0.56 | 0.61 |

The practical meaning of the above testing result may be further explained from the following two aspects. The sources of pollutants include the human body and building materials in a given space. Generally the release rate of the total pollutants is constant, which means that the average concentration of pollutants tends to be inversely proportional to changes in ventilation airflow. In order to keep the level of the pollutant concentration at a given level in varieties of building spaces and vehicles, some national and international organizations have recommended ventilation standards. The ASHRAE ventilation standard promulgates an outdoor air ventilation rate of 10 l/s/person. In civil aviation, 5 liters of air is recycled air having been filtered and only 3 to 4 liters of air is outdoor fresh air.

When the present invention is applied, 2 liters of the suggested 10 liters may be diverted to the personal air supply device of the present invention, while the other 8 liters may be distributed using a conventional ventilation system. Thus, the total volume of air circulated to the space is maintained at recommended levels so that the overall levels of pollutants will be held down in compliance with the current standard or practice. However, it is significant that the present invention provides seated persons with air that is 60% cleaner than available using prior art ventilation systems alone. It should be noted that this is achieved without increasing the outdoor intake. In passenger aircraft, this can mean significant reduction of risks of airborne infectious disease transmission between fellow passengers.

When applying the present invention to theaters or music halls, where people are out of their seats for limited times, the total input air volumes delivered may decrease from 10 l/s/person to 4 l/s/person. Of the 4 l/s/person, 2 liters may be supplied to personal air supply devices according to the present invention. Even with this reduced airflow, the quality of air inhaled by each person in the audience is the same with that of supplying 10 liters of air in prior art. This means the present invention can provide the same quality of inhaled air with the existing system, at the same time it can decrease 60% of the energy for the central air conditioning system.

Another application for the present invention is to provide additional protection for people engaged in particular occupations. These include bus drivers, truck drivers, taxi drivers, etc. A personal air supply device according to the present invention can be provided for drivers, who sit in a fixed position for a prolonged period, to improve their inhaled air quality. The passengers may still be provided with air by existing ventilation systems.

Figure 6:
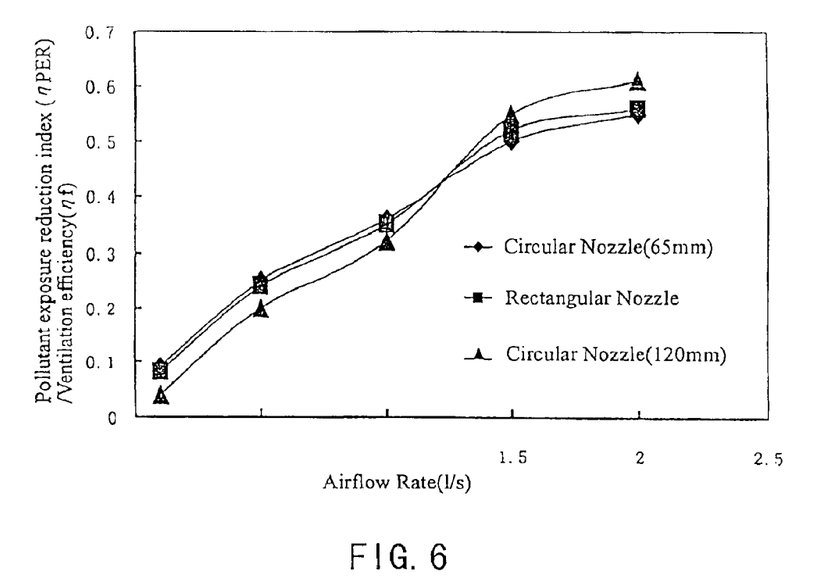
FIG. 6 illustrates the curve of pollutant exposure reduction index and ventilation efficiency of three types of supply nozzles in five types of air volumes gained by the testing device of FIG. 2.

FIG. 6 illustrates the curve of pollutant exposure reduction index $\eta_{PER}$/ventilation efficiency $\eta f$ of three nozzle sizes/shapes at five airflow rates measured according to the testing procedure of FIG. 2. The data for the graph of FIG. 6 is taken from Table 1. The graph of FIG. 6 shows that, whatever size/shape of the nozzle, the curve becomes flat as airflow increases beyond from 1.5 l/s. So using an airflow rate higher than 2 l/s may not significantly increase the ventilation efficiency $\eta f$. This is one of the reasons why the maximum airflow rate of the personal air supply device is 2 l/s. Another reason why airflow rate is limited to a maximum of 2 l/s is that wind speed will increase as the airflow rate increases because the nozzle diameter will remain constant. Discomfort of human skin will arise when exposed to high wind speed for a long time.

Figure 7:
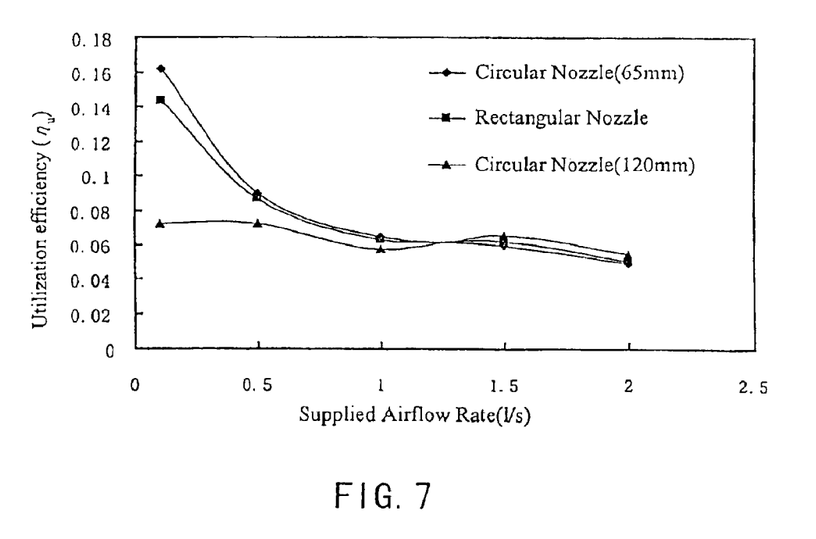
FIG. 7 illustrates the utilization efficiency curve of three types of supply nozzles in five types of air volumes tested by the testing device of FIG. 2.

FIG. 7 illustrates the utilization efficiency curve $\eta u$ for three shapes/sizes of nozzles 17 at five rates of airflows measured by the testing procedure of FIG. 2.

The utilization efficiency is defined as the ratio of inhaled fresh air to the supplied fresh air, and can be calculated by the equation:

$$\eta u = \eta f(V_L/V_f). \qquad \text{Equation 3}$$

Figure 8:
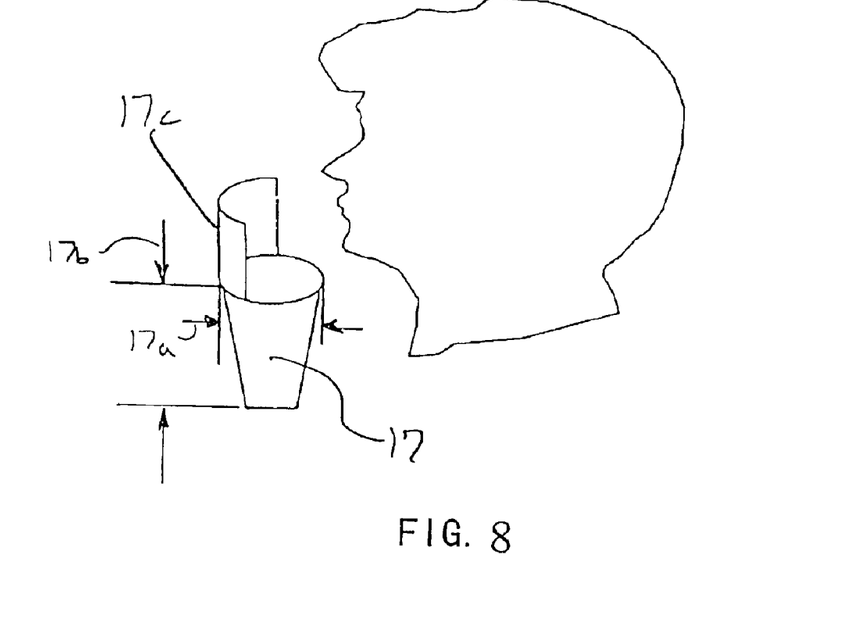
FIG. 8 illustrates the optimal external shape diagram of a supply nozzle of the personal device in the present invention.

The shape and size of the nozzle 17 used in the experiment are not designed specially for achieving perfect efficiency. The nozzles used in the experiment used existing materials for convenience, so the data in Table 1 as presented in FIG. 6 and FIG. 7 were not the best performance that can be obtained. Even so, FIG. 7 shows that the utilization efficiency $\eta u$ of the input air is approximately 5 times greater with the present invention than in the prior art (5% vs. 1%). Further improvements are possible with improvements in the shape of the nozzle 17. For example, adding a baffle 17c on the outer edge of the nozzle 17 as shown in FIG. 8 may permit a further reduction in airflow. The possibility of pollutants mixing with the inhaled air may also be reduced.

Figure 9A:
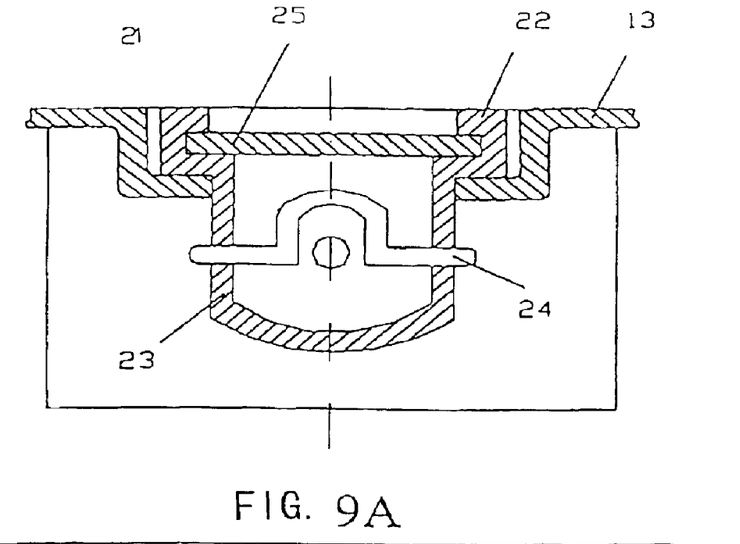
FIGS. 9A, 9B illustrate, respectively, a sectional and top plan view of an air cleaning or odor additive device on horizontal pipeline of the personal air supply device of the present invention.
Figure 9B:
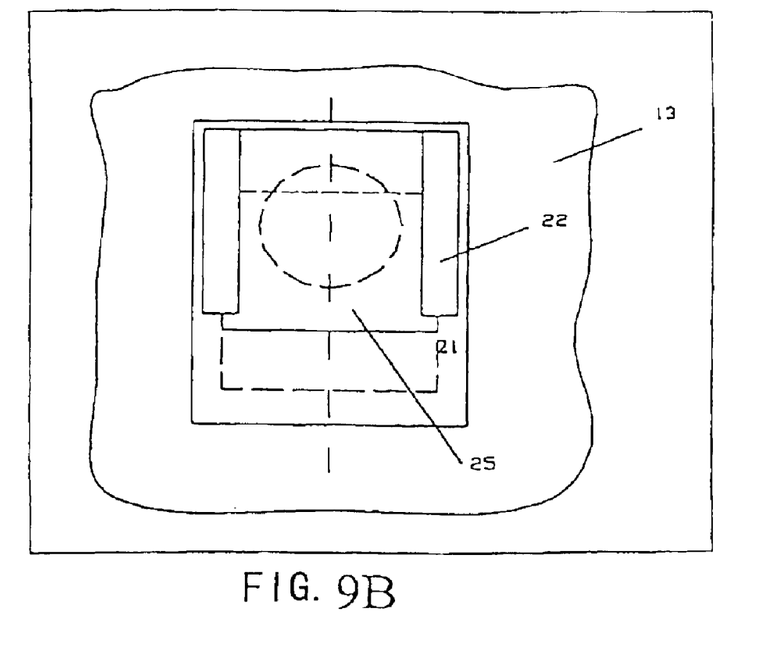

Besides the above merits, an air freshener 19 or other medicament or air cleaning medium may be optionally added in each horizontal duct 13 of the present invention. FIGS. 9A and 9B illustrate an exemplary structure for the air freshener 19. FIG. 9A is a sectional view, and FIG. 9B is a top view of the air freshener 19. Setting a rectangular superficial pit 21 on the armrest 13 (which acted as the horizontal pipeline in the example), at the end of the superficial pit there is a round perforation (as the broken line shown in the top view), which can engage in the round cup-body 23 underside of a cup-shaped apparatus 22 with round upside and quadrate underside. Cutting many small orifices circularly in the round cup-body 23 at an appropriate height (only three orifices can be seen in FIG. 9A, two of which have been run through by spring pin 24). Running through the two of these orifices by the two ends of a spring pin 24 is order that the cup-shaped apparatus 22 won't break away from the horizontal duct 13. While the other orifices can let the volatile odor of the volatile carrier (not shown in figure) lain in the cup-shaped small chamber exhale and enter into the airflow of horizontal duct 13. Reference numeral 25 of FIGS. 9A and 9B is the board assembled on the quadrate top of the cup-shaped apparatus 22. The board 25 may be moved only in the range of the rectangular superficial pit 21, so it can't break away from the quadrate top of the cup-shaped apparatus 22. The above cup-shaped apparatus 22 may be made of metal or plastic, and it can be enclosed in the round perforation of the horizontal duct 13 by airproof underlay or airproof paste. The board 25 is preferred for flexible plastic having proper strength in order to having a certain airproof performance.

The odor additive can be used in this way, dropping perfume on spongy carrier such as cotton ball, and moving the board 25 of the device 19, depositing the carrier in the round cup body of the cup-shaped apparatus 22, and close the board 25. Then the fragrance given out by the carrier will enter into the airflow of horizontal duct 13 through orifices in the cup-body 23 of the cup-shaped apparatus 22, and is sprayed to the mouth and nose of user.

I claim:

1. A personal air supply device integrated with chairs having armrests adapted for use in conjunction with an existing building or vehicle ventilation system, said personal air supply device comprising:

a supply duct in communication with a conduit of the building or vehicle ventilation system;

a horizontal duct in communication with said supply duct and integrated into an armrest of the chair;

an airflow regulating device arranged to selectively regulate the rate of airflow through said horizontal duct between a pre-determined minimum airflow and a pre-determined maximum airflow;

a tube in communication with said horizontal duct and having a free end moveable relative to said horizontal duct; and a nozzle secured to the free end of said tube, wherein a portion of air conditioned by said existing building or vehicle ventilation system passes through said supply duct, horizontal duct, tube and nozzle to be released near a breathing zone of an occupant of said chair.

2. The personal air supply device of claim 1, wherein said supply duct, horizontal duct and tube are covered with insulation and a layer to protect said insulation.

3. The personal air supply device of claim 1, comprising flexible support for said tube, said flexible support permitting said nozzle to be positioned adjacent a breathing zone of a person seated in said chair and, once so positioned, said nozzle remaining substantially stationary until moved by said person.

4. The personal air supply device of claim 1, wherein said nozzle has a cone-shaped cup body having a first end connected with said tube, said cup body expanding to an open second end having a diameter of between 6 cm and 12 cm, said cup body having a height of approximately 10 cm between said first and second ends.

5. The personal air supply system of claim 4, wherein said nozzle is made of non-flammable rubber.

6. The personal air supply system of claim 4, comprising a baffle secured to the second end of said cup body to reduce mixing between air leaving the nozzle and ambient air.

7. The personal air supply device of claim 1, wherein said horizontal duct includes a small concave chamber for receiving air freshener, said chamber being provided with perforations through which said air freshener mixes with air flowing through said horizontal duct.

8. The personal air supply device of claim 7, wherein said chamber is defined by a cup-shaped apparatus fixed in position by spring pin running through two of said perforations.

9. The personal air supply device of claim 8, wherein comprising a cover on the top of said cup-shaped apparatus, said cover moveable across the top of the chamber but not removable from said cup-shaped apparatus.

10. The personal air supply device of claim 8, wherein said cup-shaped apparatus is made of metal or plastic.

11. The ventilation system according to claim 8, wherein said cover is arranged to slide across the top of said chamber.

12. The ventilation system according to claim 11, wherein said board is made of air impermeable flexible plastic.

13. A method of operating a ventilation system including a main ventilation system serving a space and personal air supply devices located at chairs arranged in said space, said method comprising:

(1) setting said main ventilation system to supply conditioned air at a flow rate of approximately 8 l/s/person;

(2) setting said personal air supply devices to supply conditioned air at a flow rate of approximately 2 l/s;

(3) decreasing the flow rate of conditioned air supplied by said main ventilation system to approximately 2 l/s/person after occupants of said space are seated in said chairs;

(4) increasing the flow rate of conditioned air supplied by said main ventilation system to approximately 8 l/s/person before the occupants leave said space; and (5) reducing the flow rate of conditioned air supplied by said main ventilation system to approximately 2 l/s/person after all the occupants leave said space and said supplied conditioned air to be supplied via an armrest with an integrated supply duct.

14. The method of operating a ventilation system of claim 13, comprising:

repeating steps (3) and (4) for each cycle of seating occupants in said space.

* * * * *